United States Patent [19]

Elsner et al.

[11] Patent Number: 4,639,331

[45] Date of Patent: Jan. 27, 1987

[54] PROCESS FOR MAKING PULVERULENT AMMONIUM POLYPHOSPHATES STABLE TO HYDROLYSIS

[75] Inventors: Georg Elsner, Hürth; Horst Staendeke, Lohmar; Gero Heymer, Erftstadt, all of Fed. Rep. of Germany

[73] Assignee: Hoechst Aktiengesellschaft, Fed. Rep. of Germany

[21] Appl. No.: 603,120

[22] Filed: Apr. 23, 1984

[30] Foreign Application Priority Data

May 7, 1983 [DE] Fed. Rep. of Germany ....... 3316880

[51] Int. Cl.$^4$ ...................... C09K 21/04; C09K 21/10; C08K 3/28; C08K 3/32
[52] U.S. Cl. ................................ 252/609; 106/18.15; 106/18.16; 106/18.21; 106/18.31; 106/18.32; 252/610; 521/85; 521/106; 521/907; 523/200; 523/208; 523/210; 524/416; 524/594
[58] Field of Search .................. 252/609, 7, 601, 607, 252/610, 182; 106/18.14, 18.15, 18.16, 18.17, 18.21, 18.31, 18.32, 15.05; 524/416, 594; 521/85, 106, 906–907; 523/208, 200, 210–211

[56] References Cited

U.S. PATENT DOCUMENTS

| | | | |
|---|---|---|---|
| 3,423,343 | 1/1969 | Barnett et al. ...................... | 260/2.5 |
| 3,892,577 | 7/1975 | Sugahara et al. ..................... | 106/14 |
| 4,009,137 | 2/1977 | Dany et al. ................. | 260/29.6 MP |
| 4,129,693 | 12/1978 | Cenker et al. ........................ | 521/106 |
| 4,202,779 | 5/1980 | Smith et al. ......................... | 252/609 |
| 4,341,694 | 7/1982 | Halpern .............................. | 252/606 |
| 4,347,334 | 8/1982 | Staendeke et al. .................. | 524/416 |
| 4,442,157 | 4/1984 | Marx et al. ........................... | 252/607 |
| 4,467,056 | 8/1984 | Staendeke et al. .................. | 521/106 |
| 4,514,328 | 4/1985 | Staendeke et al. .................. | 252/606 |

Primary Examiner—Stephen J. Lechert, Jr.
Assistant Examiner—Howard J. Locker
Attorney, Agent, or Firm—Connolly and Hutz

[57] ABSTRACT

The disclosure relates to a process for making a particulate agent stable to hydrolysis based on free-flowing, pulverulent ammonium polyphosphate by treating the ammonium polyphosphate with a thermosetting, artificial resin being water-insoluble when cured. More specifically, the disclosure provides for the ammonium polyphosphate, an aliphatic alcohol as a diluent, and a melamine/formaldehyde-resin or phenol/formaldehyde-resin to be placed in an autoclave and intimately mixed at room temperature; for the mixture to be heated to a temperature of about 80° to about 180° C. and allowed to remain over a period of 15 to 240 minutes at that temperature and under the pressure corresponding to the vapor pressure of the diluent; for the diluent to be separated and for the product so obtained to be dried.

8 Claims, No Drawings

PROCESS FOR MAKING PULVERULENT AMMONIUM POLYPHOSPHATES STABLE TO HYDROLYSIS

The present invention relates to a process for making pulverulent ammonium polyphosphates stable to hydrolysis, briefly termed APP hereinafter, by microencapsulating the APP-particles with a thermosetting resin being water-insoluble when cured.

It has been disclosed in German Patent Specification DE-OS No. 29 49 537 that a particulate agent based on free-flowing pulverulent ammonium polyphosphates of the general formula:

$$H_{(n-m)+2}(NH_4)_m P_n O_{3n+1}$$

in which n stands for a whole number having an average value of about 20 to 800 and the m/n-ratio is about 1 can be used for preventing the combustibility of combustible substances, the agent consisting of
(a) about 75 to 99 weight % ammonium polyphosphate and
(b) about 1 to 25 weight % of a cured, water-insoluble polycondensation product of melamine and formaldehyde encapsulating the individual ammonium polyphosphate particles.

The melamine/formaldehyde-resin is applied to the ammonium polyphosphate particles, for example, by first suspending the ammonium polyphosphate in methanol, then heating the suspension until weak reflux of methanol and dropping a methanolic aqueous solution of the melamine/formaldehyde-resin into the suspension. After a post-reaction period of 0.5 to 2 hours, for example, the suspension is filtered and the filter residue is dried in a stream of nitrogen at 100° C. over a period of 150 to 180 minutes. While the ammonium polyphosphate particles are being dried the resin coating applied thereonto becomes cured.

As indicated in German Specification DE-OS No. 30 05 252, it is possible in accordance with German Patent Specification DE-OS No. 29 49 537 for the stability to hydrolysis of pulverulent ammonium polyphosphates to be also improved by applying a cured, water-insoluble phenol resin coating to the APP-particles. The resins can be applied to the ammonium polyphosphate particles either in an alcoholic resin solution by curing the resin with agitation of the ammonium polyphosphate/resin-suspension or by evaporating the solvent present in the suspension in a heated kneader and heat-setting or spray-drying the suspension.

By encapsulating the ammonium polyphosphate particles in a cured phenol resin or phenol/formaldehyde-resin, the solubility of ammonium polyphosphate in water is considerably reduced and this benefically influences the use of such pretreated ammonium polyphosphate as a flame-retardant agent for polyurethane foams.

The stability to hydrolysis of these prior products is an index of the behaviour of coated APP when exposed for a short while to the action of water at 25° C., depending on the respective testing method.

We have now found that the stability to hydrolysis of the above products at higher temperatures, e.g. at 60° C., which are normal for one use or other ammonium polyphosphate is put to, decreases, namely that up to ten times more APP is soluble in water than at 25° C. It is therefore highly desirable to remedy this deficiency and to provide coated ammonium polyphosphate stable to hydrolysis in the presence of water even at increased temperature, the coating applied to the APP-particles corresponding substantially completely and the particle size distribution of the resulting product corresponding widely to that in the uncoated APP.

Apart from the deficiencies of the prior art products referred to hereinabove, the processes used for making them are also not fully satisfactory.

During the production of coated APP in a kneader, the walls and tools of the kneader become soiled with depositing material which is ultimately required to be removed mechanically. In addition to this, on freeing the APP/resin-mixture from the solvent by means of a gas stream, fine particulate fractions of the mixture are carried along by the gas stream which must ultimately be freed therefrom.

In a kneader, it is finally impossible to prevent individual particles from baking together whereby the particle size distribution in the coated APP is adversely affected. Agglomerated caked APP fractions which are subsequently ground are liable, in the ground material, to entail the formation of fracture surfaces inviting the hydrolysis of APP in contact with water.

The present invention now provides a process for making a particulate agent stable to hydrolysis based on free-flowing, pulverulent ammonium polyphosphate of the general formula $$H_{(n-m)+2}(NH_4)_m P_n O_{3n+1}$$

in which n stands for a whole number having an average value of about 20 to 800 and the m/n-ratio is about 1, by treating the ammonium polyphosphate in the presence of a diluent and with agitation with a thermosetting artificial resin being water-insoluble when cured, separating the diluent and drying the ammonium polyphosphate at a temperature setting the artificial resin, which comprises: placing, in whatever sequential order, the ammonium polyphosphate, an aliphatic $C_1$–$C_4$ alcohol as a diluent, and a melamine/formaldehyde-resin or phenol/formaldehyde-resin, optionally dissolved in a solvent, in an autoclave and intimately mixing them at room temperature therein; heating the mixture to a temperature of about 80° to about 180° C. and, for curing the resin component, allowing the mixture to remain over a period of 15 to 240 minutes at that temperature and under the pressure corresponding to the vapor pressure of the diluent; cooling the mixture to room temperature, separating the diluent and drying the product so obtained.

A preferred feature of the present process provides for the ammonium polyphosphate, diluent and resin component to be used in a ratio by weight of 1:1.5:0.1.

The resin component should preferably be a melamine/formaldehyde-resin, the uncured resin being a powder of which a 50% aqueous solution has a dynamic viscosity of 20 mPa.s, a pH-value at 20° C. of 8.8 to 9.8 and a density at 20° C. of 1.21 to 1.225 (g/ml), or an alcohol-soluble hardenable, unplasticized phenol resin (phenol/formaldehyde resin) or a thermosetting phenol resol.

It is also preferable to heat the mixture at temperatures of 110° to 130° C. and to limit the cure period to 30 to 60 minutes.

The process of this invention permits the product quality to be beneficially acted upon in various respects: Thus, the product coated in accordance with this invention presents a particle size distribution substantially inaltered as compared with the particle size distribution in the APP feed material. Agglomerated material which may be found to have been fomed during the coating operation is easy to crush by minor mechanical action without formation of undesirable fracture surfaces at the agglomerated particles. Products which were aftertreated by grinding them with a particle size distribution identical with that determined for the APP feed material could not be found to behave differently from unground material, as regards soluble matter content. The final agent generally consists of particles with a mean size of about 0.01 to 0.05 mm.

A further technically beneficial effect of the process of this invention resides in that the quality of the coated APP remains unaffected by the sequential order selected for the introduction of the individual components into the reaction vessel. In other words, it is possible, for example, for the alcohol and APP to be introduced into a stirring vessel, for the resin to be added thereto and for the coating to be effected while stirring and heating. Alternatively, it is possible for a resin solution in water to be added to the alcohol in the stirring vessel and for the whole to be admixed with APP. An especially advantageous method provides for the resin, APP and anhydrous methanol, for example, to be mixed in a stirring vessel and for the coating and hardening steps to be effected by heating. This method provides for the methanol which is recovered during filtration to be repeatedly used without expensive distillation which is more particularly rendered difficult by the fact that the heat exchanger surface areas in a distilling unit may become soiled with certain resin portions which are ultimately required to be removed therefrom by expensive cleaning treatment.

The products made in accordance with this invention can be used for conferring flame-retardant properties upon polyurethane or polyurethane foams, the foams containing the flame retardant agent in a proportion of about 5 to 50 weight %, based on the quantity of polyol component in the polyurethane. The present products can also be used for imparting flame retardant properties to cellulose-containing materials, e.g. paper grades, paper board and card board and the like, and corrugated paper or card board as secondary products, the materials containing the flame retardant agent in a proportion of about 5 to 30 weight %, based on dry fibrous material.

The process of this invention and the properties of the products obtained are more fully described in the Examples hereinafter. The process was carried out with the use of commercially available feed materials. Use was more particularly made of the following materials:
1. EXOLIT 422 (this is a registered Trade Mark of Hoechst AG., Frankfurt/Main, Federal Republic of Germany).

It is a fine particulate, difficultly water-soluble ammonium polyphosphate of the formula $(NH_4PO_3)_n$, in which n stands for about 700. More than 99% of the APP-particles have a size of less than $45\mu$.

2. MADURIT MW 390 (this is a registered Trade Mark of Cassella Aktiengesellschaft, Frankfurt/Main, Federal Republic of Germany).

The uncured product is a pulverulent melamine/formaldehyde-resin, of which a 50 weight % aqueous solution has a dynamic viscosity of 20 mPas.s, a pH-value at 20° C. of 8.8 to 9.8, and a density at 20° C. of 1.21 to 1.225 (g/ml)

EXAMPLE 1

200 l methanol, 100 kg APP and 10 kg melamine resin were placed in a 300 liter stirring vessel and stirred therein at room temperature to give a suspension. Next, the stirring vessel was closed and the whole was heated to 120° C. A pressure of about 6 bars was found to establish in the vessel. The material in the reactor was allowed to stand over a period of 1 hour at that temperature, cooled and given onto a suction filter. The methanol was suction-filtered and collected for further use. The coated APP was dried by passing heated nitrogen therethrough. The dried product weighed 108 kg. Its other properties are indicated in Table I hereinafter.

EXAMPLE 2

100 kg APP was suspended in 200 l methanol in the stirring vessel. Next, a solution of 10 kg melamine resin in 10 kg warm water (40° C.) was added. The stirring vessel was closed, the temperature was increased to 120° C. and maintained for 1 hour. The other procedure was as in Example 1.

109 kg product was obtained. It had the properties indicated in Table I hereinafter.

EXAMPLE 3

100 kg APP was suspended in a water/methanol-mixture consisting of 36 l water and 164 l methanol in a stirring vessel. Next, 10 kg solid melamine resin was added. The other procedure was as in Example 1. 108 kg product was obtained. It had the properties indicated in Table I hereinafter.

EXAMPLE 4

The product of Example 2 was ground in a Pallmann mill. The ground product had the properties indicated in Table I hereinafter.

EXAMPLES 5 TO 10

The procedure was in each case as in Example 1, the quantities of reactants used in Example 5 corresponding to those used in Example 1. From Example 6 on, the methanol recovered in Example 5 was reused; methanol lost during drying (about 30 l) was replaced by fresh methanol. The quantity of resin used was reduced to 8 kg. After each batch, the methanol was tested for its water content and solid matter content. The results obtained are indicated in Table II. The properties of the products coated as described in Examples 5 to 10 are indicated in Table III.

TABLE I

| | Properties of product | | |
|---|---|---|---|
| Ex. | Particle size | Fractions soluble in $H_2O$ at 25° C. | Fractions soluble in $H_2O$ at 60° C. |
| 1 | 96% < 75μ | 0.9 wgt % | 1.8 wgt % |
| 2 | 98% < 75μ | 0.5 wgt % | 2.0 wgt % |
| 3 | 99% < 75μ | 1.0 wgt % | 2.1 wgt % |
| 4 | 99% < 45μ | 0.7 wgt % | 1.8 wgt % |

TABLE II

| Ex. | Water content of methanol | Solid matter content of methanol |
|---|---|---|
| 5 | 2.2 wgt % | 2.4 wgt % |
| 6 | 4.5 wgt % | 2.6 wgt % |
| 7 | 6.6 wgt % | 2.1 wgt % |
| 8 | 9.0 wgt % | 2.8 wgt % |
| 9 | 11.2 wgt % | 2.5 wgt % |

TABLE II-continued

| Ex. | Water content of methanol | Solid matter content of methanol |
| --- | --- | --- |
| 10 | 13.0 wgt % | 2.9 wgt % |

TABLE III

| | Properties of product | | |
| --- | --- | --- | --- |
| Ex. | Particle size | Fractions soluble in H$_2$O at 25° C. | Fractions soluble in H$_2$O at 60° C. |
| 5 | 99% < 150μ | 0.3 wgt % | 1.8 wgt % |
| 6 | 99% < 150μ | 0.35 wgt % | 1.9 wgt % |
| 7 | 96% < 150μ | 0.32 wgt % | 1.4 wgt % |
| 8 | 98% < 150μ | 0.7 wgt % | 3.2 wgt % |
| 9 | 97% < 150μ | 0.7 wgt % | 2.4 wgt % |
| 10 | 99% < 150μ | 0.6 wgt % | 2.3 wgt % |

We claim:

1. Process for making a particulate, free-flowing, pulverulent ammonium polyphosphate of the general formula

$$H_{(n-m)+2}(NH_4)_m P_n O_{3n+1}$$

in which n stands for a whole number having an average value of about 20 to 800 and the m/n ratio is about 1, wherein 75 to 99 parts by weight ammonium polyphosphate are encapsulated with 1 to 25 parts by weight melamine/formaldehyde-resin or phenol/formaldehyde-resin, which comprises:

placing particulate ammonium polyphosphate, an aliphatic C$_1$-C$_4$ alcohol as a diluent, and melamine/formaldehyde-resin or phenol/formaldehyde-resin in an autoclave and initmately mixing them as a suspension at room temperature therein, heating the suspension to a temperature of 80° to 180° C., allowing the mixture to remain over a period of 15 to 240 minutes at that temperature, cooling the mixture to room temperature, separating the alcohol and dring the product so obtained.

2. Process as claimed in claim 1, which comprises:
placing 1 part by weight particulate ammonium polyphosphate with 1.5 part by weight aliphatic C$_1$-C$_4$ alcohol and 0.1 part by weight melamine/formaldehyde-resin or 0.1 part by weight phenol/formaldehyde-resin in an autoclave and intimately mixing them as a suspension at room temperature therein, heating the suspension to a temperature of 110° to 130° C., allowing the mixture to remain over a period of 15 to 240 minutes at that temperature, cooling the mixture to room temperature, separating the alcohol and drying the product so obtained.

3. Process as claimed in claim 1, wherein the mixture is heated to a temperature of 110° to 130° C.

4. Process as claimed in claim 1, wherein the mixture is cured over a period of 30 to 60 minutes.

5. Process as claimed in claim 1, wherein the finished agent consists of particles with a means size of about 0.01 to 0.05 mm.

6. Process as claimed in claim 1, wherein the ammonium polyphosphate, alcohol and resin component are used in a quantitative ratio of 1:1.5:0.1.

7. Process as claimed in claim 1, wherein the uncured melamine/formaldehyde-resin is a powder of which a 50% aqueous solution has a dynamic viscosity of 20 mPa.s, a pH-value at 20° C. of 8.8 to 9.8 and a density at 20° C. of 1.21 to 1.225 g/ml.

8. Process as claimed in claim 1, wherein the phenol resin is an alcohol-soluble, thermosetting, unplasticized phenol resin (phenol/formaldehyde resin) or a thermosetting phenol resin.

* * * * *